(12) United States Patent
Bullock et al.

(10) Patent No.: US 11,794,204 B2
(45) Date of Patent: Oct. 24, 2023

(54) SPRAY NOZZLE MOUNTING FOR RECEIVING FLUID FROM DISTRIBUTION PIPE

(71) Applicant: Deere & Company, Moline, IL (US)

(72) Inventors: Stacy L. Bullock, Ankeny, IA (US); Richard A. Humpal, Ankeny, IA (US); Travis G. Funseth, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 1107 days.

(21) Appl. No.: 16/523,399

(22) Filed: Jul. 26, 2019

(65) Prior Publication Data

US 2019/0344303 A1 Nov. 14, 2019

Related U.S. Application Data

(62) Division of application No. 15/208,062, filed on Jul. 12, 2016, now Pat. No. 10,406,551.

(60) Provisional application No. 62/206,387, filed on Aug. 18, 2015.

(51) Int. Cl.
| | |
|---|---|
| *B05B 15/658* | (2018.01) |
| *B05B 13/02* | (2006.01) |
| *F16L 41/06* | (2006.01) |
| *F16L 41/12* | (2006.01) |

(52) U.S. Cl.
CPC ........ *B05B 15/658* (2018.02); *B05B 13/0278* (2013.01); *F16L 41/06* (2013.01); *F16L 41/12* (2013.01); *Y10T 137/6123* (2015.04)

(58) Field of Classification Search
CPC .... B05B 15/658; B05B 13/0278; F16L 41/06; F16L 41/12; Y10T 137/6123
See application file for complete search history.

(56) References Cited

U.S. PATENT DOCUMENTS

| | | | |
|---|---|---|---|
| 2,946,518 A | 7/1960 | Wahlin | |
| 3,009,655 A | 11/1961 | Palmer | |
| 3,817,270 A * | 6/1974 | Ehrens | F16L 41/065 285/197 |
| 6,230,091 B1 | 5/2001 | McQuinn | |
| 7,066,402 B2 | 6/2006 | Goebel et al. | |
| 7,861,946 B2 * | 1/2011 | Beeren | B05B 1/1645 137/884 |
| 2006/0108456 A1 | 5/2006 | Beeren | |
| 2011/0240143 A1 | 10/2011 | Lang et al. | |

(Continued)

*Primary Examiner* — Qingzhang Zhou
*Assistant Examiner* — Joel Zhou

(57) ABSTRACT

A spray nozzle body has an upper end provided with a clamp arrangement comprising upper and lower clamp halves tightly clamped onto a fluid supply tube having a preselected first diameter. A removable tubular fluid delivery stem is received in a receiver hole extending vertically into the nozzle body from a clamping surface of the lower clamp half and has an upper end portion tightly received in a fluid outlet hole, of preselected size, provided in the supply tube. The clamp arrangement may be reconfigured for being clamped onto a smaller fluid supply tube by providing a replacement upper clamp half and a pipe-size adapter, each having appropriately sized clamping surfaces, with the adapter being seated within the clamping surface of the lower clamp half. The pipe-size adapter incorporates a suitably dimensioned fluid delivery stem.

11 Claims, 3 Drawing Sheets

(56) References Cited

U.S. PATENT DOCUMENTS

2013/0153676 A1 6/2013 Ballu
2015/0300549 A1 10/2015 Cheng-Sheng et al.

\* cited by examiner

SPRAY NOZZLE MOUNTING FOR RECEIVING FLUID FROM DISTRIBUTION PIPE

RELATED APPLICATIONS

This is a divisional application of U.S. application Ser. No. 15/208,062, titled SPRAY NOZZLE MOUNTING FOR RECEIVING FLUID FROM DISTRIBUTION PIPE, filed Jul. 12, 2016, which claims the priority of U.S. Provisional Application No. 62/206,387, titled SPRAY NOZZLE, filed Aug. 18, 2015 which are hereby incorporated by reference in their entirety.

FIELD OF THE DISCLOSURE

The present disclosure relates generally to spray nozzles used for the application of liquid substances used in agricultural or industrial applications, and more particularly relates to mounting structure for securing a nozzle body onto a fluid distribution pipe for receiving fluid from a liquid outlet hole provided in the pipe.

BACKGROUND OF THE DISCLOSURE

Large system sprayers apply nutrients, herbicides, paints, chemicals and other liquids such as those used in the agricultural or manufacturing industries. The spray systems may have a fluid distribution pipe that is mounted to a boom or other rigid structure. Spray nozzles are mounted along the fluid distribution pipe and receive the fluid flowing through the pipe from respective fluid outlet holes provided in the pipe. Various sprayer applications and various global markets (different regions of the world use different ISO standards to define fluid distribution pipes) require spray nozzles to be secured onto a variety of spray pipe sizes and/or require the distribution pipes to have a variety of spray liquid outlet bore sizes for accommodating higher or lower flow capacities (the outlet holes in the distribution pipe can range from approximately 9.5 mm for standard nozzles, and up to approximately 17 mm for high flow capacity nozzles) as well as requiring attaching assemblies for accommodating various pipe diameter sizes. For example, two common pipe sizes in sprayer applications are 1" standard pipe size or 20 mm tubing.

Designing an integrated and robust clamping system that minimizes cost and complexity is the challenge.

SUMMARY OF THE DISCLOSURE

Various aspects of examples of the disclosure are set out below and in the claims.

According to a first aspect, a nozzle body has an upper end defined by a supply pipe clamp assembly including upper and lower clamp halves releasably secured together and providing confronting upper and lower cradle surfaces cooperating with each other to define an opening in which a cylindrical fluid supply pipe of a preselected diameter may be received in clamped fixed relationship to the nozzle body with the lower clamp half being at least partially integrally formed by a remaining upper end portion of the nozzle body, a vertical cylindrical receiver hole is provided in the upper end portion of the nozzle body for communicating fluid to an interior of the nozzle body and has an upper open end located at a bottom location of the lower cradle surface, and a cylindrical, tubular fluid delivery stem is releasably inserted into the receiver hole and has an upper end elevated above the bottom location of the lower cradle surface and sized for being tightly inserted through a fluid outlet hole of a preselected diameter provided in the fluid supply pipe.

According to a second aspect, the lower clamp half is entirely formed integrally with the remaining upper end portion of the nozzle body.

According to a third aspect, the lower clamp half includes that portion of the lower clamp half that is at least partially integrally formed by the remaining upper end portion of the nozzle body and includes the at least one lower cradle surface, the lower clamp half further includes a selectively insertable pipe-size adapter having a bottom surface nested in said at least one lower cradle surface and includes a top surface defining a second lower cradle surface, with the second lower cradle surface cooperating with the upper cradle surface for embracing the cylindrical pipe, and the fluid delivery stem is formed integrally with said pipe-size adapter.

According to a fourth aspect, a diametrically extending strengthening web is provided interiorly of said fluid delivery stem and located at least in an upper end portion of said fluid delivery stem that is elevated above the lower cradle surface and oriented so as to extend in a direction of travel of the nozzle assembly during spraying operation.

According to a fifth aspect, a method is stated for adapting the clamp assembly for use with fluid supply pipes of different preselected diameters and/or for use with fluid supply pipes having different sized fluid outlets.

These and other aspects will become apparent from a reading of the following description together with the appended drawings.

BRIEF DESCRIPTION OF THE DRAWINGS

The detailed description of the drawings refers to the accompanying figures in which.

DETAILED DESCRIPTION OF THE DRAWINGS

Figure 1:
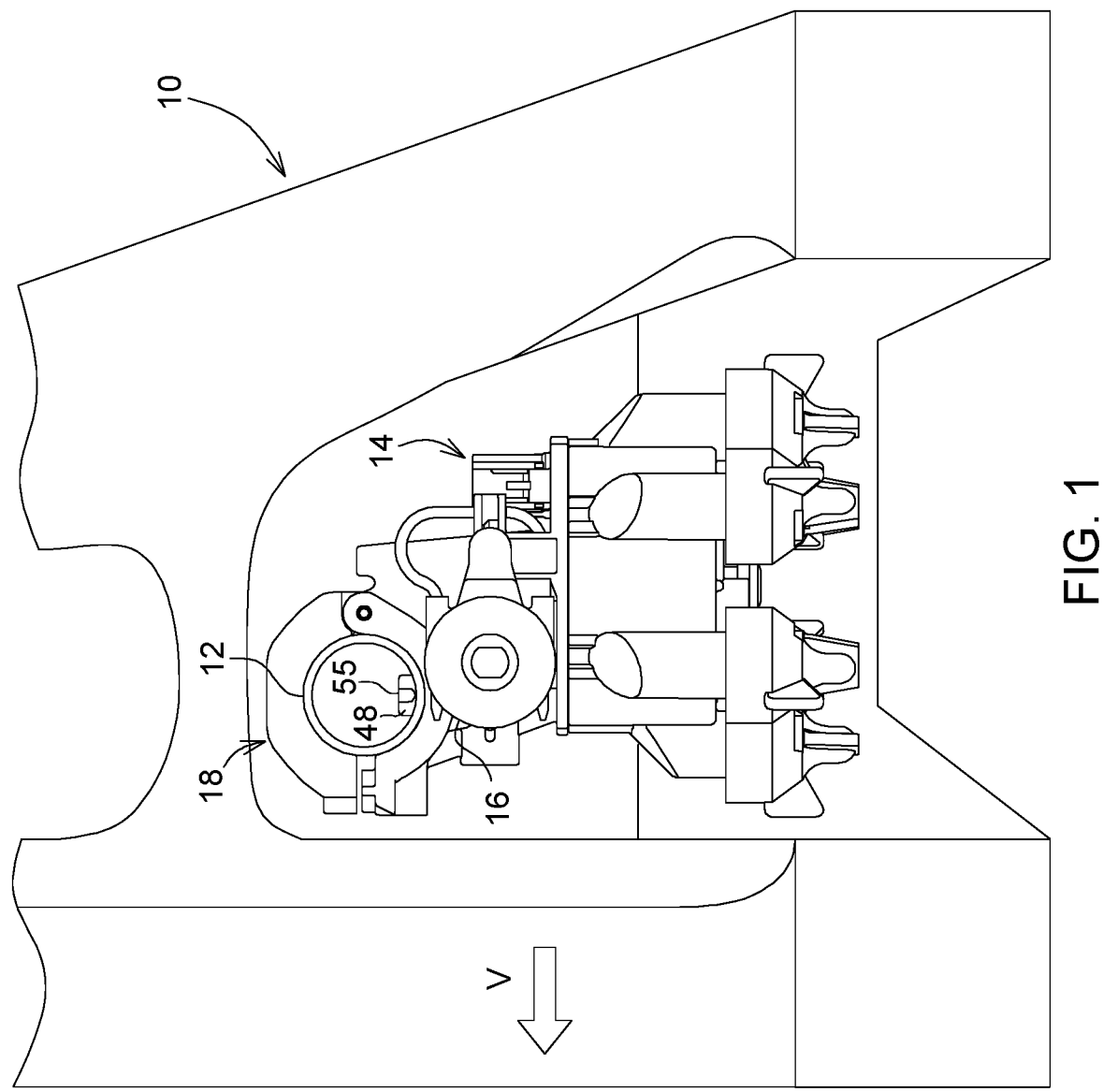
FIG. 1 is a left side view of a nozzle assembly mounted to a fluid supply pipe having a first diameter and carried by a spray boom support truss arrangement.
Figure 2:
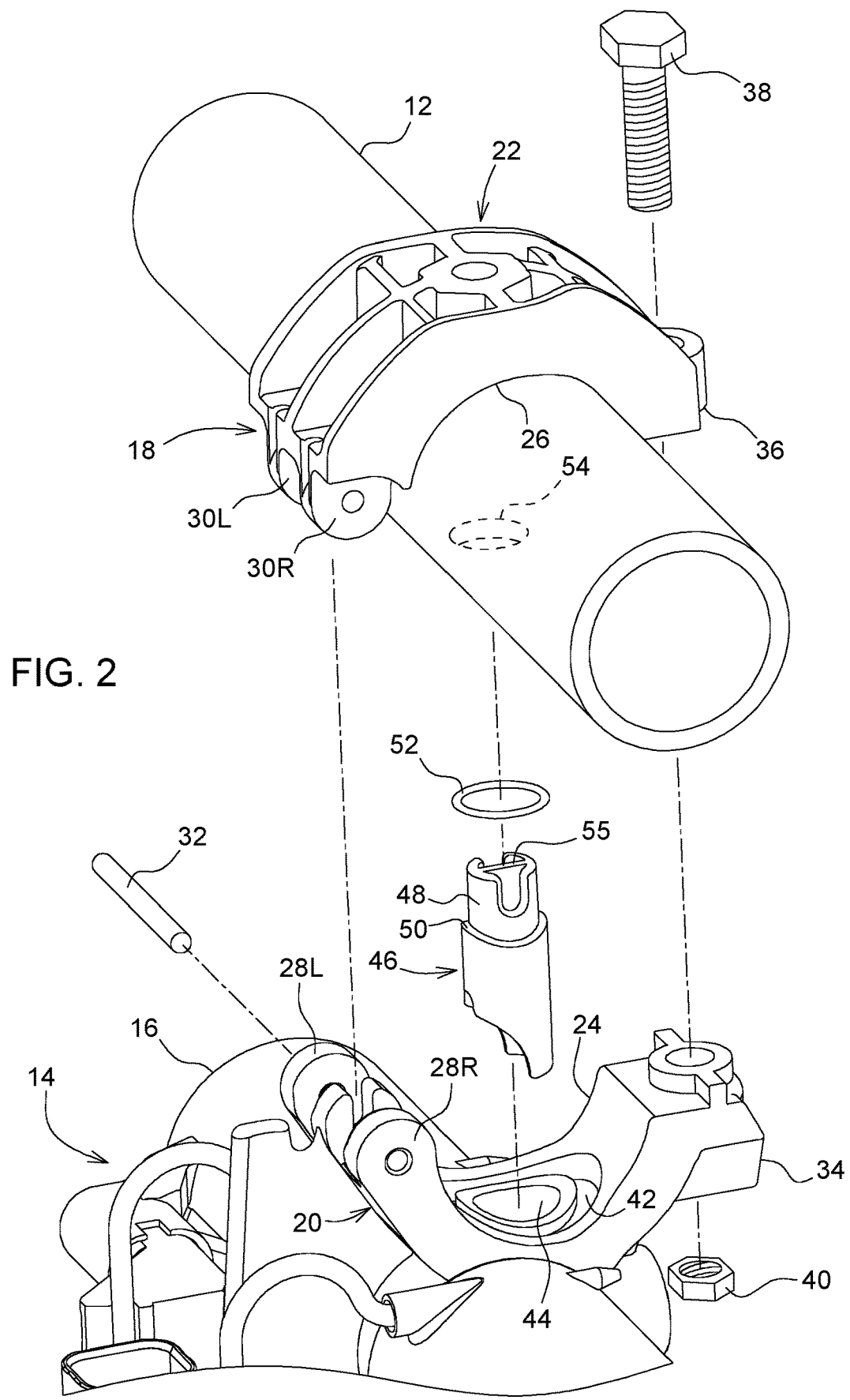
FIG. 2 is an exploded right rear perspective view of the coupled region of the nozzle assembly of FIG. 1 showing an upper end of a fluid supply stem aligned for being received in a fluid outlet of the fluid supply pipe and a lower region for being received in a nozzle body receiver hole for conducting fluid to an interior of the nozzle body.
Figure 3:
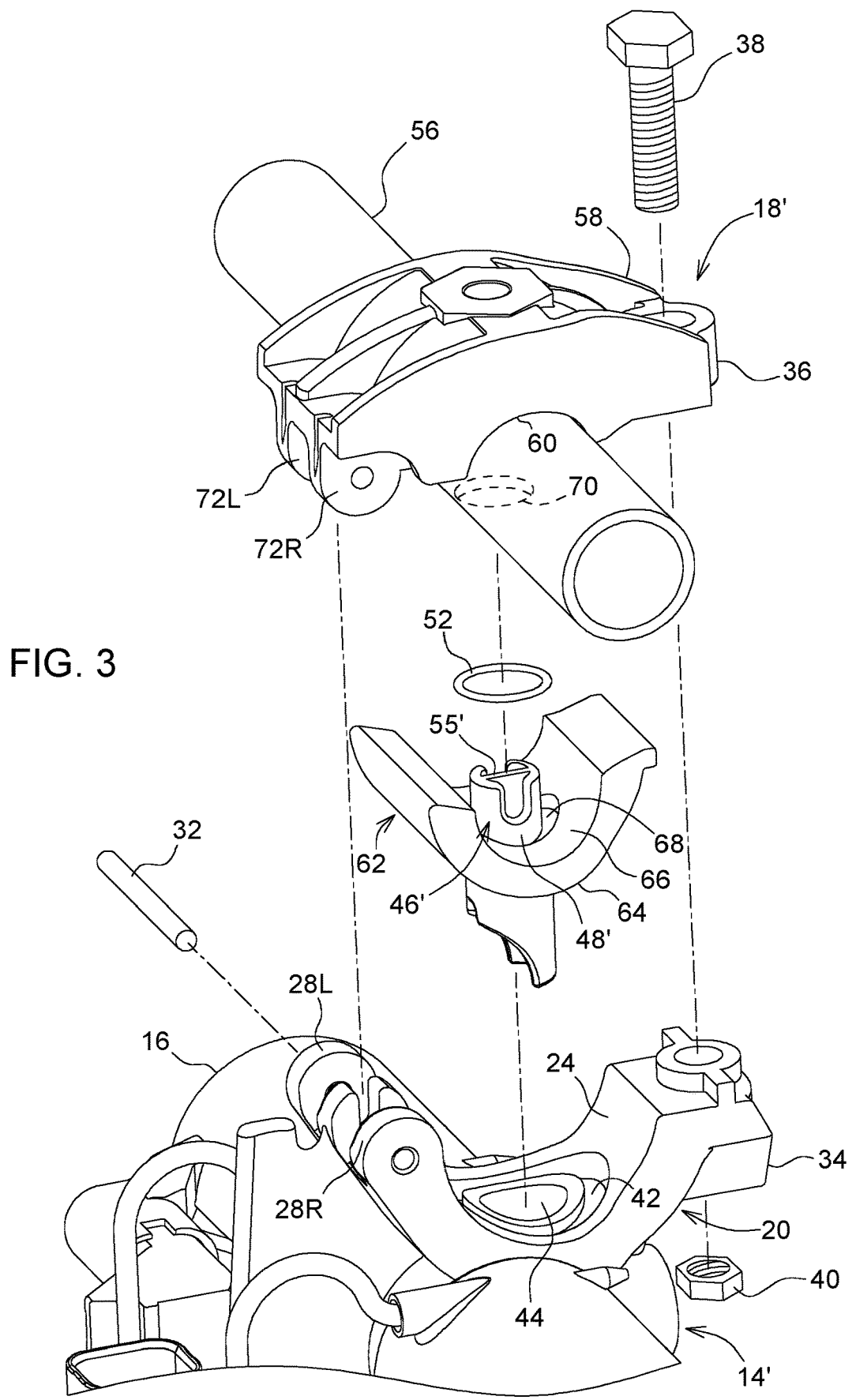
FIG. 3 is a view like that of FIG. 2, but showing a fluid supply pipe having a smaller diameter than the supply pipe shown in FIG. 2 and showing a different top clamp half mounted to the lower clamp half of FIG. 2 and having an upper clamping surface mated with a pipe-size adapter received by the lower clamp half of FIG. 2 for accommodating the smaller diameter pipe.

At least one example embodiment of the subject matter of this disclosure is understood by referring to FIGS. 1 through 3 of the drawings.

Referring now to FIG. 1, there is shown a left side view of a segment of a spray boom 10 including a fluid supply pipe 12 to which spray nozzles 14 (only one visible) are secured at laterally spaced locations for traveling in a forward direction of travel V during spraying operation.

Referring now also to FIG. 2, it can be seen that each spray nozzle 14 includes a body 16 having a clamp arrangement 18 at a forward side thereof and including lower and upper clamp halves 20 and 22, respectively. The clamp halves 20 and 22 have respective, substantially semi-cylindrical, interior clamping surfaces 24 and 26 shaped to at least roughly conform to, and being engaged with, an outer cylindrical surface of the fluid supply pipe 12. Fixed at a rear location of the lower clamp half 20 are transversely spaced, upwardly projecting right and left lugs 28R and 28L containing horizontally extending, axially aligned holes. Fixed at a rear location of the upper clamp half 22 and extending downwardly between, and respectively adjacent to, the right and left lugs 28R and 28L are upper right and left lugs 30R and 30L, which each contain horizontal holes that are aligned with the holes provided in the lugs 28R and 28L. A horizontal hinge pin 32 extends through the holes provided in the lugs 28R, 28L, 30R and 30L. Forward ends of the clamp halves 20 and 22 define respective lower forward and upper forward mounting flanges 34 and 36 which contain aligned vertical holes and are secured to each other by a bolt fastener 38 inserted downwardly through the holes and having a nut 34 tightened on an exposed lower end region so as to tightly engage the clamp halves 20 and 22 with the supply pipe 12. The hinge pin 32 acts to permit the upper clamp half 22 to be pivoted away from the fluid supply pipe 12 once the nut 40 is removed from the bolt fastener 38.

Located centrally in the bottom of the clamping surface 24 of the lower clamp half 20 is an annular recess 42 surrounding an upper end of a cylindrical receiver hole 44 in which is received a cylindrical tubular fluid supply stem 46 having an upper, reduced diameter end section 48 defining an upwardly facing annular shoulder 50, with an o-ring 52 being received on the stem end section 48 and in engagement with the shoulder 50. The stem 46 is located within the receiver bore 44 with the end section 48 being received in a circular fluid outlet hole 54 having a pre-selected diameter and being provided at a bottom location of the supply pipe 12. It is noted that the o-ring is 52 is compressed against the supply tube 12 to prevent leakage between the pipe 12 and the stem 46. Further, it is noted that a strengthening rib 55 is provided within the tubular stem 46 and is oriented in the direction of travel V (see FIG. 1) of the nozzle 14 so as to prevent the stem 46 from being damaged due to dynamic forces generated by the suspended mass of the nozzle assembly 14 tending to rotate about supply pipe 12 during spraying operation.

Referring now also to FIG. 3, there is shown a nozzle 14' that is secured by a clamp arrangement 18' to a supply pipe 56 having a preselected diameter that is smaller than the preselected diameter of the supply pipe 12. It is to be noted that the only differences between the nozzles 14 and 14' are those dealing with the clamp arrangement 18' needed for accommodating the smaller sized pipe 56. However, if it is desired to provide a fluid outlet hole 70 having a different preselected diameter than that of the hole 54, it would also be necessary to provide a fluid supply stem having a correspondingly different sized upper end section in place of upper end section 48. All the other structure is the same for the two nozzles 14 and 14', with the structural parts of the nozzle 14' that are identical to those of the nozzle 14 being indicated by the same reference numerals. The clamp arrangement 18' includes the same lower clamp half 20 as does the clamp arrangement 18, but includes an upper clamp half 58 that is provided with a semi-cylindrical upper clamping surface 60 sized for tight engagement with, an upper region of the smaller sized pipe 56. To accommodate the smaller diameter pipe 56, the lower clamp half is modified by a saddle-shaped pipe-size adapter 62 which includes a lower surface 64 shaped complementary to, and mounted in engagement with, the lower clamping surface 24 of the lower clamp half 20. The pipe-size adapter 62 has a semi-cylindrical upper surface defining a lower clamping surface 66 mounted in engagement with a lower surface region of the pipe 56. The pipe-size adapter 62 incorporates a tubular supply fluid stem 46' having an upper end section 48' received in the supply fluid outlet hole 70 in the supply pipe 56 and a section below the pipe-size adapter 66 received in the receiver hole 44 when the adapter is properly seated in the clamping surface 24. An upwardly opening annular recess 68 is formed in the adapter 62 and extends about the stem 46'. The o-ring 52 is received on the reduced diameter, upper end region 48' of the stem 46'. A strengthening rib 55' is located within the tubular stem 46' and is oriented in the direction of forward travel V (see FIG. 1) for preventing the stem from being damaged due to the suspended weight of the nozzle 14' tending to rotate about the pipe 56 during spraying operation.

The rear end of the upper clamp half 58 is provided with right and left downwardly extending lugs 72R and 72L, respectively, located between and adjacent the lugs 28R and 28L of the lower clamp half 20. The pin 32 is received in axially aligned bores provided in the lugs 28R, 28L, 72R and 72L and thereby couples the upper clamp half 58 for pivoting upward and away from the supply pipe 56. A forward end of the upper clamp half 58 is provided with a mounting flange 74 located directly above the mounting flange 28 of the lower clamp half 20, with the mounting flanges 74 and 28 including respective vertical bores that are axially aligned and receive the fastener bolt 38, with the nut being received on the lower end of the bolt and securing the clamp halves 20 and 58 in tight engagement with the supply pipe 56. Upon removal of the fastener bolt 38 and nut 40, the upper clamp half 58 can be pivoted upward and away from the pipe 56.

Without in any way limiting the scope, interpretation, or application of the claims appearing below, a technical effect of one or more of the example embodiments disclosed herein is that the spray nozzles can be quickly and economically adapted for mounting to fluid supply pipes of different standard diameters and/or to supply pipes having different standard fluid outlets since such adaptation or adaptions require that only that the upper clamp half and/or fluid supply stem be exchanged for ones of different preselected sizes.

While the above describes an example embodiment of the present disclosure, this description should not be viewed in a limiting sense. Rather, there are several variations and modifications which may be made without departing from the scope of the present invention as defined in the appended claims.

What is claimed is:

1. A method of adapting a nozzle assembly to a first fluid pipe or a second fluid pipe, the nozzle assembly comprising a lower clamp, a first upper clamp, a second upper clamp, a seal, an adapter and a stem, the method comprising:

selecting one of the first upper clamp shaped to at least conform to and engaged with the first fluid pipe and the second upper clamp shaped to at least conform to the second fluid pipe;

selecting the adapter, the seal and the lower clamp, wherein the adapter includes a lower surface shaped complementary to, and mounted in engagement with, a clamping surface of the lower clamp; wherein the seal being received on the stem and separable from the adapter; inserting the stem into a receiver positioned in the lower clamp, wherein the stem includes an interior rib oriented in a direction of travel of the nozzle assembly during a spraying operation; and coupling the first upper clamp and the lower clamp with the first fluid pipe or coupling the second upper clamp and the adapter and lower clamp with the second fluid pipe, wherein a diameter of the second fluid pipe is smaller than a diameter of the first fluid pipe.

2. The method of claim 1, wherein a clamping surface of the first upper clamp in contact with the first fluid pipe has a radius of curvature substantially the same as the clamping surface of the lower clamp in contact with the first fluid pipe.

3. The method of claim 1, wherein a clamping surface of the second upper clamp in contact with the second fluid pipe has a radius of curvature substantially the same as a clamping surface of the adapter in contact with the second fluid pipe.

4. The method of claim 1, wherein the nozzle assembly further comprises the seal positioned between the stem and the first fluid pipe or the second fluid pipe.

5. A method of adapting a nozzle assembly from a first fluid pipe to a second fluid pipe, the first fluid pipe having a larger diameter than the second fluid pipe, the nozzle assembly comprising a lower clamp, a first upper clamp, and a stem positioned in a receiver located in the lower clamp, the method comprising:
   a) decoupling the first upper clamp from the lower clamp, the first upper clamp and the lower clamp configured for cooperatively engaging the first fluid pipe;
   b) removing the lower clamp from the first fluid pipe, which includes removing the stem from a fluid outlet of the first fluid pipe and removing the stem from the receiver of the lower clamp;
   c) inserting an adapter into the lower clamp, inserting a second stem in the adapter, and orienting an interior rib of the second stem in the direction of travel of the nozzle assembly during a spraying operation, wherein the adapter is configured for cooperatively engaging the second fluid pipe;
   d) coupling the lower clamp to the second fluid pipe including inserting the second stem into a fluid outlet of the second fluid pipe; and
   e) coupling a second upper clamp in place of the first upper clamp, the second upper clamp configured for cooperatively engaging the second fluid pipe and the lower clamp.

6. The method of claim 5, further comprising inserting the second stem into the receiver through the adapter.

7. The method of claim 5, wherein a clamping surface of the first upper clamp in contact with the first fluid pipe has a radius of curvature substantially the same as a clamping surface of the lower clamp in contact with the first fluid pipe.

8. The method of claim 5, wherein a clamping surface of the second upper clamp in contact with the second fluid pipe has a radius of curvature substantially the same as a clamping surface of the adapter in contact with the second fluid pipe.

9. The method of claim 5, wherein the nozzle assembly further comprises a seal positioned between the stem and the first fluid pipe.

10. The method of claim 5, including inserting an end section of the second stem into a fluid outlet of the second fluid pipe having a pre-selected diameter.

11. A method of adapting a nozzle assembly to a first fluid pipe or a second fluid pipe, the nozzle assembly comprising a lower clamp, a first upper clamp, a second upper clamp, a seal an adapter and a stem, the method comprising:
   selecting one of the first upper clamp shaped to at least conform to and engaged with the first fluid pipe and the second upper clamp shaped to at least conform to the second fluid pipe;
   selecting the adapter, the seal and the lower clamp, wherein the adapter includes a lower surface shaped complementary to, and mounted in engagement with, a clamping surface of the lower clamp, the seal being received on the stem and separable from the adapter and the stem includes an interior rib oriented in a direction of travel of the nozzle assembly during a spraying operation; and
   coupling the first upper clamp and the lower clamp with the first fluid pipe or coupling the second upper clamp and the adapter and lower clamp with the second fluid pipe, wherein a diameter of the second fluid pipe is smaller than a diameter of the first fluid pipe.

\* \* \* \* \*